United States Patent
Ru

(10) Patent No.: US 11,991,093 B2
(45) Date of Patent: May 21, 2024

(54) INFORMATION PROCESSING METHOD AND APPARATUS, AND STORAGE MEDIUM

(71) Applicant: GUANGDONG OPPO MOBILE TELECOMMUNICATIONS CORP., LTD., Dongguan (CN)

(72) Inventor: Zhao Ru, Dongguan (CN)

(*) Notice: Subject to any disclaimer, the term of this patent is extended or adjusted under 35 U.S.C. 154(b) by 0 days.

(21) Appl. No.: 18/089,289

(22) Filed: Dec. 27, 2022

(65) Prior Publication Data

US 2023/0216810 A1 Jul. 6, 2023

Related U.S. Application Data

(63) Continuation of application No. PCT/CN2020/119995, filed on Oct. 9, 2020.

(51) Int. Cl.
*H04L 47/70* (2022.01)
*H04L 9/40* (2022.01)

(52) U.S. Cl.
CPC ............ *H04L 47/82* (2013.01); *H04L 63/126* (2013.01)

(58) Field of Classification Search
CPC .............................. H04L 47/82; H04L 63/126
See application file for complete search history.

(56) References Cited

U.S. PATENT DOCUMENTS 6,785,721 B1 * 8/2004 Immerman ......... G06F 21/6218
709/221

8,041,761 B1 * 10/2011 Banga .................. G06Q 20/382
705/52
2004/0201604 A1 * 10/2004 Kraenzel ................ G06Q 10/10
707/999.201

(Continued)

FOREIGN PATENT DOCUMENTS

CN 107580790 A 1/2018
CN 111314394 A 6/2020
(Continued)

OTHER PUBLICATIONS

International Search Report and Written Opinion dated Jun. 24, 2021 in International Application No. PCT/CN2020/119995. English translation attached.

(Continued)

*Primary Examiner* — Shean Tokuta
(74) *Attorney, Agent, or Firm* — Sheppard, Mullin, Richter, & Hampton, LLP

(57) ABSTRACT

The present disclosure provides an information processing method and apparatus, and a storage medium, capable of testing resource discovery performance of a server device. The method includes: transmitting, by a client device, a first resource discovery request to a server device, in which the first resource discovery request is used to request resource information and security domain information of the server device; and determining, by the client device, a capability of the server device for responding to resource discovery based on whether a first resource response message is correctly received from the server device, to complete a test of resource discovery performance of the server device. The method ensures that server devices that pass the test can all correctly respond to resource discovery requests, which prevents subsequent services from being affected by performance issues of the server devices.

17 Claims, 6 Drawing Sheets

(56) References Cited

U.S. PATENT DOCUMENTS

| | | | | |
|---|---|---|---|---|
| 2005/0223413 | A1* | 10/2005 | Duggan | G06F 21/6236 726/3 |
| 2005/0246771 | A1* | 11/2005 | Hunt | H04L 9/3273 726/18 |
| 2014/0113556 | A1* | 4/2014 | Kotecha | H04W 12/0471 455/41.2 |
| 2017/0055203 | A1* | 2/2017 | Lee | H04W 92/18 |
| 2019/0052995 | A1* | 2/2019 | Agrawal | H04B 17/30 |
| 2019/0320038 | A1* | 10/2019 | Walsh | H04L 67/567 |
| 2020/0169549 | A1 | 5/2020 | Smith | |
| 2022/0027520 | A1* | 1/2022 | Li | G06F 11/0772 |
| 2023/0032814 | A1* | 2/2023 | Pandurangan | H04L 63/108 |
| 2023/0199534 | A1* | 6/2023 | Rodrigo | H04L 43/10 370/252 |
| 2023/0216810 | A1* | 7/2023 | Ru | H04L 63/126 709/203 |

FOREIGN PATENT DOCUMENTS

| | | | | |
|---|---|---|---|---|
| EP | 3264807 | A1 | 1/2018 | |
| EP | 4149060 | A1 | 3/2023 | |
| EP | 4184809 | A1 * | 5/2023 | H04B 7/24 |
| KR | 100562255 | B1 * | 3/2006 | |
| KR | 20200110844 | A * | 9/2020 | |
| KR | 20220126736 | A * | 9/2022 | |
| WO | WO-2009143750 | A1 * | 12/2009 | H04L 63/10 |
| WO | 2013142139 | A2 | 9/2013 | |
| WO | 2019075317 | A1 | 4/2019 | |
| WO | 2019089164 | A1 | 5/2019 | |
| WO | WO-2021142803 | A1 * | 7/2021 | H04L 63/0209 |
| WO | WO-2021142849 | A1 * | 7/2021 | |
| WO | WO-2021237527 | A1 * | 12/2021 | H04L 63/20 |
| WO | WO-2022073196 | A1 * | 4/2022 | H04L 47/82 |
| WO | 2013142139 | A3 | 9/2023 | |

OTHER PUBLICATIONS

Open Connectivity Foundation, "Certification_Test_Requirements_v2002.0.0", Version 2002.0.0, Aug. 4, 2020 (Aug. 4, 2020), section 5.4.3.3.

Extended European Search Report dated Nov. 28, 2023 received in European Patent Application No. EP20956511.8.

* cited by examiner

INFORMATION PROCESSING METHOD AND APPARATUS, AND STORAGE MEDIUM

CROSS-REFERENCE TO RELATED APPLICATIONS

This application is a continuation of International Application No. PCT/CN2020/119995 filed on Oct. 9, 2020, which is incorporated herein by reference in its entirety.

FIELD

Embodiments of the present disclosure relate to the field of Internet of Things (IoT) technologies, and more particularly, to an information processing method and apparatus, and a storage medium.

RELATED ART

The IoT, or "Internet of Everything", is an extended and expanded network based on the Internet, which establishes mutual perception between "things" using a variety of sensing technologies to achieve tracking, control, and positioning of at the granularity of individual objects.

As a technical standard organization that develops an application layer for the IoT, the Open Connectivity Foundation (OCF) has formulated a service framework for interconnection of devices in the IoT. In this service framework, an entity that provides resources is a server device, and an entity that accesses the resources may be a client device. The client device needs to perform resource discovery before performing operations such as creation, update, and deletion on the resources of the server device.

In some scenarios, due to performance issues of the server device itself, the client device may be unable to discover the resources of the server device, which affects subsequent services.

SUMMARY

Embodiments of the present disclosure provide an information processing method and apparatus, and a storage medium.

In a first aspect, an embodiment of the present disclosure provides an information processing method. The method includes: transmitting, by a client device, a first resource discovery request to a server device, the first resource discovery request including security domain information of the server device; and determining, by the client device, whether a first resource discovery response message is received from the server device.

In a second aspect, an embodiment of the present disclosure provides an information processing method. The apparatus includes: receiving, by a server device, a first resource discovery request transmitted by a client device, the first resource discovery request including security domain information of the server device; and determining, by the server device, whether to transmit a first resource discovery response message to the client device.

In a third aspect, an embodiment of the present disclosure provides a client device. The client device includes a memory and a processor. The memory stores a computer program. The processor is configured to invoke and execute the computer program from the memory to: transmit a first resource discovery request to a server device, wherein the first resource discovery request comprises security domain information of the server device; and determine whether a first resource discovery response message is received from the server device.

DETAILED DESCRIPTION

In order to make objects, technical solutions, and advantages of the present disclosure more apparent, technical solutions according to embodiments of the present disclosure will be described clearly and completely below with reference to the accompanying drawings of the embodiments of the present disclosure. Obviously, the embodiments described below are only a part of the embodiments of the present disclosure, rather than all embodiments of the present disclosure. On a basis of the embodiments of the present disclosure, all other embodiments obtained by those skilled in the art without creative labor shall fall within the protection scope of the present disclosure.

The terms "including" and "having" and any variants thereof as used in the description of the embodiments of the present disclosure, the appended claims, and the above accompanying drawings are intended to cover non-exclusive inclusions. For example, a process, method, system, product, or device that includes a series of steps or units is not necessarily limited to those explicitly listed steps or units, but may also include other steps or units that are not explicitly listed or are inherent to the process, method, product, or device.

Figure 1:
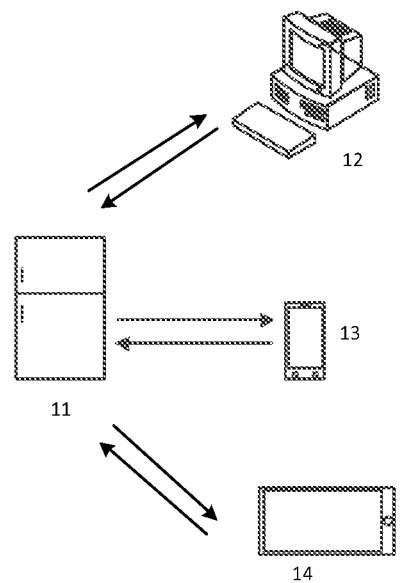
FIG. 1 is a schematic diagram showing a structure of an IoT system applied in an embodiment of the present disclosure.

Before introduction of the technical solutions according to the embodiments of the present disclosure, an IoT system applied in the embodiments of the present disclosure will be described first. FIG. 1 is a schematic diagram showing a structure of an IoT system applied in an embodiment of the present disclosure. As illustrated in FIG. 1, the IoT system includes a server device 11 and a plurality of client devices, such as client devices 12 to 14 in FIG. 1. The server device 11 is connected to each client device. The plurality of client devices may be connected to each other (not illustrated in FIG. 1). It should be understood that one or more server devices 11 may be provided, and FIG. 1 is used as an example only.

The server device serves as an entity for the client device to access resources, and may be a data collection device such as a sensor or a data collection card, an electrical component device such as a switch, a socket, or a lamp, or an electronic device such as an intelligent air conditioner, washing machine, refrigerator, speaker, or television. Of course, the above examples are only some possible examples of the server device. The server device may also be other intelligent hardware devices that can provide resources to implement corresponding functional services. The embodiments of the present disclosure are not limited to any of these examples. The server device may be called an OCF service device or entity, a resource entity, a resource provider, or a resource device, etc.

The client device may be a terminal device having an OCF client installed thereon. The terminal device may be a desktop computer, a laptop computer, a Personal Digital Assistant (PDA), a smartphone, a tablet computer, or other devices. The client device may also be called an OCF client device, a user device, a user-side device, etc.

Based on the above IoT system, the client device may perform an operation, e.g., creation, update, and deletion, on a resource of the server device by transmitting an operation request to the server device to achieve a corresponding service. It should be noted that before performing the operation on the resource of the server device, the client device needs to transmit a retrieval request to the server device to discover the resource of the server device. A detailed description of a resource discovery process will be given below with reference to FIG. 2.

Figure 2:
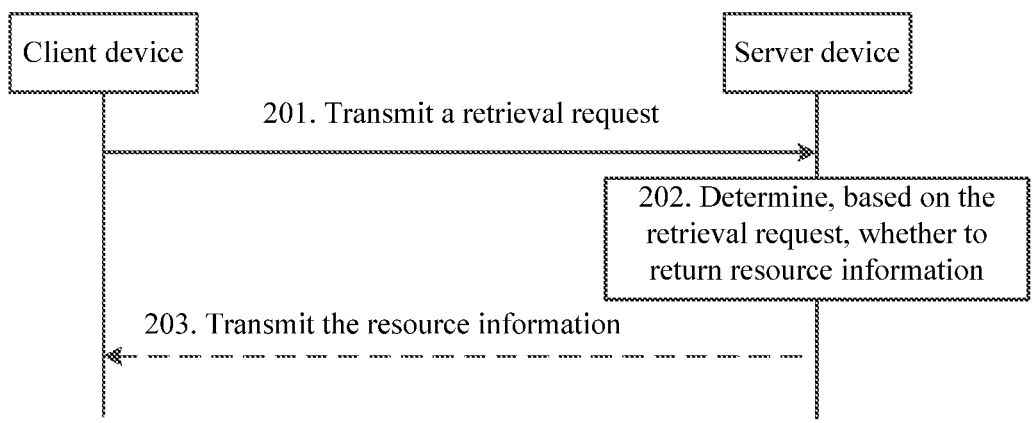
FIG. 2 is a schematic diagram showing an interaction of a resource discovery process according to an embodiment of the present disclosure.

FIG. 2 is a schematic diagram showing an interaction of a resource discovery process according to an embodiment of the present disclosure. As illustrated in FIG. 2, the resource discovery process of this embodiment may include operations at blocks 201 to 203.

At block 201, the client device transmits a retrieval request to the server device.

In an embodiment of the present disclosure, to discover resources on a plurality of server devices, the client device may transmit the retrieval request to the server devices via broadcast or multicast (not illustrated in FIG. 2).

In an embodiment of the present disclosure, when the client device only wants to discover a resource on a specific single server device, the client device may transmit the retrieval request to the target server device via unicast, as illustrated in FIG. 2.

The retrieval request includes at least a resource identifier. The resource identifier may be a resource identifier used for resource directory discovery, which may be a Uniform Resource Identifier (URI). The URI may be, for example, /oic/res.

In an example, the client device may use a query condition in the retrieval request to define an object of discovery. For example, when the client device wants to discover a resource of a target server device, a query condition including an identifier (ID) (sduuid) of a target security domain may be added to the retrieval request to define the object of discovery.

The query condition may be defined based on a resource type, a resource interface, or other resource attributes.

The resource type may be used to represent a resource type (rt) provided by the server device, including an oic resource, an res resource, etc. For example, an rt parameter may be "oic.wk.rd", "oic.wk.res", "oic.r.switch.binary", "oic.r.light.brightness", "oic.wk.p", "oic.wk.d", etc, in which "oic.wk.rd" corresponds to an rd resource, and "oic.wk.res" corresponds to an res resource.

The resource interface (if), also called resource access interface, may be used to represent an access interface of a resource provided by the server device. An if parameter may be "oic.if.ll", "oic.if.b", "oic.if.baseline", etc.

Resource attributes include inherent resource attributes (or common resource attributes) and other resource attributes. The inherent resource attributes are specified in all resources and include the following attributes: a resource type, a resource interface, a name, and a resource identifier. The other resource attributes include a URI of a resource. The URI of the resource includes two attribute parameters: an href parameter and an anchor parameter (a format of a parameter value is ocf://<deviceID>).

At block 202, the server device determines, based on the retrieval request, whether to return resource information.

When the server device determines to return the resource information, the operation at block 203 is performed. When the server device determines not to return the resource information, the server device transmits no resource information to the client device.

At block 203, the server device transmits the resource information to the client device.

In this block, the server device receives the retrieval request, obtains a target resource and a query condition in the retrieval request, and determines whether its own/oic/res resource meets the query condition. When the query condition is met, the server device returns its resource list (i.e., the resource information). The resource list includes the href parameter, the anchor parameter, the rt parameter, and the if parameter. A plurality of if parameters may be provided. That is, the server device may return a plurality of interfaces. when the resource of the server device is accessed subsequently, one of the plurality of interfaces may be specified in the request. When no interface is specified, a default interface is used.

The existing standard specifies that the well-known resource oic/res is used as a default discovery mechanism and requires all devices to support this device discovery mechanism. Each device updates discoverable resources to local/oic/res of the device. Each time a new discoverable resource is instantiated on the device, the instantiated resource needs to be updated to local/oic/res of the device.

The above resource discovery process will be described below in combination with a specific example.

1. The client device obtains a security domain ID of a server device, for example, 12345678-1234-1234-1234-123412341234.

2. The client device creates a search request (or called resource discovery request) based on the security domain ID, for example:
    RETRIEVE    coap://[ff02::158]:    5683/oic/res?sd-uuid="12345678-1234-1234-1234-123412341234"

The client device transmits the above search request via multicast in a local area network.

3. Server Device 1, Server Device 2, and Server Device 3 receive the search request, parse the target resource and the query condition, and determine whether their own/oic/res resources have the sduuid attribute and whether their sduuid values are identical to an sduuid value in the search request.

4a. Server Device 1 determines that its own/oic/res resource has the sduuid attribute and its sduuid value is "12345678-1234-1234-1234-123412341234", which is identical to the sduuid value in the search request. A response of the/oic/res resource is returned by Server Device 1 to the client device via unicast.

4b. Server Device 2 determines that its own/oic/res resource has the sduuid attribute and its sduuid value is "dc70373c-1e8d-4fb3-962e-017eaa863989", which is different from the sduuid value in the search request. No response is returned by Server Device 2 to the client device.

4c. Server Device 3 determines that its own/oic/res resource has no sduuid attribute, and thus no response is returned by Server Device 3 to the client device.

Based on the above application scenarios, any performance issue of the server device, such as poor network connection stability or other failures of the device, may make it impossible for the client device to receive a response returned by the server device and discover the resource of the server device, which affects subsequent services.

In view of the above technical problems, the embodiments of the present disclosure provide an information processing method, a main idea of which is as follows: before application of actual resource discovery, a response condition of the server device is checked by obtaining the security domain information of the server device, creating the resource discovery request based on the security domain information, and transmitting the resource discovery request to the server device. In addition, for other possible application scenarios, such as an application scenario where the resource discovery request is used for requesting resources from another server device, resource discovery requests for a plurality of positive and negative use cases are created and transmitted to the server device, and a capability of the server device for responding to a resource discovery mechanism is determined based on each response of the server device, which ensures that each server device can respond properly to different scenarios, and prevents the subsequent services from being affected by performance issues of the server device.

The technical solutions according to the embodiments of the present disclosure are described in detail below with specific examples. It should be noted that the technical solutions according to the embodiments of the present disclosure may include some or all of the following description. The following specific embodiments can be combined with each other, and the same or similar concepts or processes may not be repeated in some embodiments.

Figure 3:
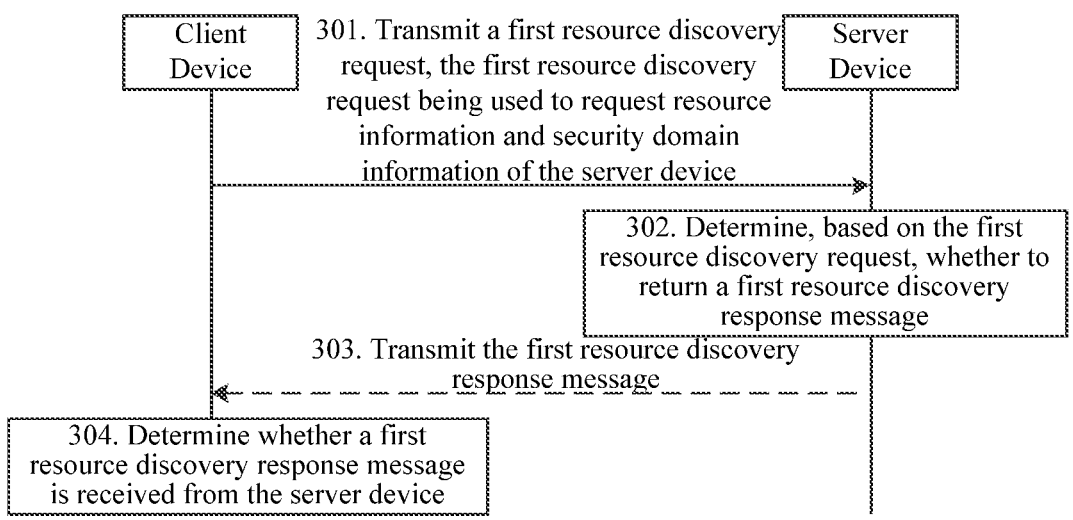
FIG. 3 is a schematic diagram showing an interaction of an information processing method according to an embodiment of the present disclosure

FIG. 3 is a schematic diagram showing an interaction of an information processing method according to an embodiment of the present disclosure. As illustrated in FIG. 3, the information processing method according to the embodiment of the present disclosure includes the following blocks.

At block 301, a client device transmits a first resource discovery request to a server device. The first resource discovery request is used to request resource information and security domain information of the server device.

The client device of this embodiment may be a client device having an OCF client installed thereon, which may be regarded as a test device (Conformance Test Tool, or CTT). The server device of this embodiment may be regarded as a device under test (Implementation Under Test, or IUT). The client device is in a communication connection to the server device via a network. For example, the client device and the server device may communicate via a local area network.

The first resource discovery request includes at least one of a first identifier of a security domain configured by the client device for the server device or a first interface. The first identifier of the security domain configured by the client device for the server device may be understood as an identifier of a security domain pre-configured by the client device for the server device. The first interface is used to instruct the server device to return the security domain information of the server device.

The resource information of the server device includes the href parameter (resource URI), the anchor parameter (deviceID), the rt parameter (resource type), and the if parameter (resource interface). When the resource of the server device supports a plurality of resource types, the plurality of resource types may be returned. When the resource of the server device has a plurality of interfaces, the plurality of interfaces may be returned.

The security domain information of the server device includes an identifier (ID) of the security domain and a security domain discoverability identifier, and may also include a security domain name. The identifier of the security domain is represented by uuid. The security domain discoverability identifier is represented by priv. A value false of priv indicates that the security domain is discoverable, and a value true of priv indicates that the security domain is undiscoverable. The security domain name is represented by name.

In an embodiment of the present disclosure, the first resource discovery request includes a first identifier of a security domain configured by the client device for the server device and a first interface. The first interface is specifically used to instruct the server device to return the security domain identifier uuid and the security domain name of the server device. For example, the first resource discovery request may be expressed as:

RETRIEVE/oic/res?if=oic.if.baseline&sduuid=12345678-1234-1234-1234-123412341234. This request includes the first identifier "sduuid=12345678-1234-1234-1234-123412341234" and the first interface "if=oic.if.baseline". The first identifier and the first interface may be regarded as query conditions.

It should be noted that the server device may determine, based on the first interface in the first resource discovery request, whether to return the security domain information of the server device to the client device. For example, when the first interface is "oic.if.ll", the security domain information of the server device is not returned to the client device. When the first interface is "oic.if.baseline", the security domain information of the server device is returned to the client device.

In an example, the client device may transmit the first resource discovery request to the server device via broadcast, multicast, or unicast. The embodiments of the present disclosure are not limited to any of these examples.

At block 302, the server device determines, based on the first resource discovery request, whether to return a first resource discovery response message.

When the server device determines to return the first resource discovery response message, the operation at block 303 is performed.

When the server device determines not to return the first resource discovery response message, the server device transmits no first resource discovery response message.

At block 303, the server device transmits the first resource discovery response message to the client device.

In an embodiment of the present disclosure, the server device may determine, based on the first identifier in the first resource discovery request, whether to return the first resource discovery response message. It should be noted that the server device pre-saves an identifier of the security domain of the server device. The server device may compare the saved identifier of the security domain of the server device with the first identifier in the first resource discovery request. When the saved identifier and the first identifier are identical, the server device transmits the first resource discovery response message to the client device. When the saved identifier and the first identifier are different, the server device transmits no first resource discovery response message.

The first resource discovery response message includes at least one of a second identifier of the security domain of the server device or a second resource link of the server device. The second identifier of the security domain of the server device refers to the identifier of the security domain of the server device pre-saved by the server device. The second resource link of the server device is the resource information of the server device and includes the href parameter, the anchor parameter, the rt parameter, and the if parameter.

When the first interface in the first resource discovery request is "oic.if.baseline", the first resource discovery response message includes the second identifier of the security domain of the server device and the second resource link of the server device.

When the first interface in the first resource discovery request is "oic.if.ll", the first resource discovery response message includes the second resource link of the server device.

At block 304, the client device determines whether the first resource discovery response message is received from the server device.

In particular, the client device may determine a capability of the server device for responding to resource discovery based on whether the first resource discovery response message is received from the server device.

In an embodiment of the present disclosure, the client device determines, in response to determining that the first resource discovery response message is received from the server device, the capability of the server device for responding to the resource discovery based on the first resource discovery response message.

The client device may determine the capability of the server device for responding to the resource discovery in at least two implementations as follows.

In one possible implementation, the client device determines the capability of the server device for responding to the resource discovery based on the first identifier of the security domain pre-configured by the client device for the server device and the second identifier of the security domain of the server device in the first resource response message. In some embodiments, when the first identifier is same as the second identifier, the client device determines that the capability of the server device for responding to the resource discovery meets a test requirement. When the first identifier is different from the second identifier, the client device determines that the capability of the server device for responding to the resource discovery fails to meet the test requirement.

In one possible implementation, the client device determines the capability of the server device for responding to the resource discovery based on the first resource link of the client device pre-saved by the client device and the second resource link of the server device in the first resource response message. In some embodiments, when the first resource link is same as the second resource link, the client device determines that the capability of the server device for responding to the resource discovery meets the test requirement. When the first resource link is different from the second resource link, the client device determines that the capability of the server device for responding to the resource discovery fails to meet the test requirement.

As can be seen from the above two implementations, even if the server device has determined whether to return the first resource discovery response message, considering differences in capabilities of the server devices for responding to the resource discovery mechanism, or possible problems such as a failure of the server device or an error made by the server device in executing relevant codes, in a solution of the embodiment, the client device can make a further determination, i.e., by comparing whether the first identifier configured by the client device for the server device is the same as the second identifier returned by the server device, or comparing whether the first resource link of the server device saved by the client device is the same as the second resource link returned by the server device, to test whether the server device has properly implemented the security domain-based discovery mechanism.

In an example, after receiving the first resource discovery response message from the server device, the client device may directly save the first resource response message, e.g., the second resource link of the server device in the first resource response message.

In an example, the client device may save, in response to receiving the first resource discovery response message from the server device, the first resource discovery response message only after determining that the capability of the server device for responding to the resource discovery meets the test requirement. That is, the first resource discovery response message is saved only when the first identifier is the same as the second identifier and/or the first resource link is the same as the second resource link. For example, the second resource link of the server device in the first resource discovery response message can be saved.

In an embodiment of the present disclosure, when the client device determines that no first resource discovery response message is received from the server device, the client device determines that the capability of the server device for responding to the resource discovery does fails to meet the test requirement.

The information processing method according to the embodiments can be applied in testing device performance. The client device transmits the first resource discovery request to the server device. The first resource discovery request is used to request the resource information and the security domain information of the server device. The client device determines the capability of the server device for responding to the resource discovery based on whether the first resource response message is correctly received from the server device. Therefore, a test of performance of the server device is completed. The method ensures that server devices that pass the test can all correctly respond to resource discovery requests, which prevents subsequent services from being affected by performance issues of the server devices.

Figure 4:
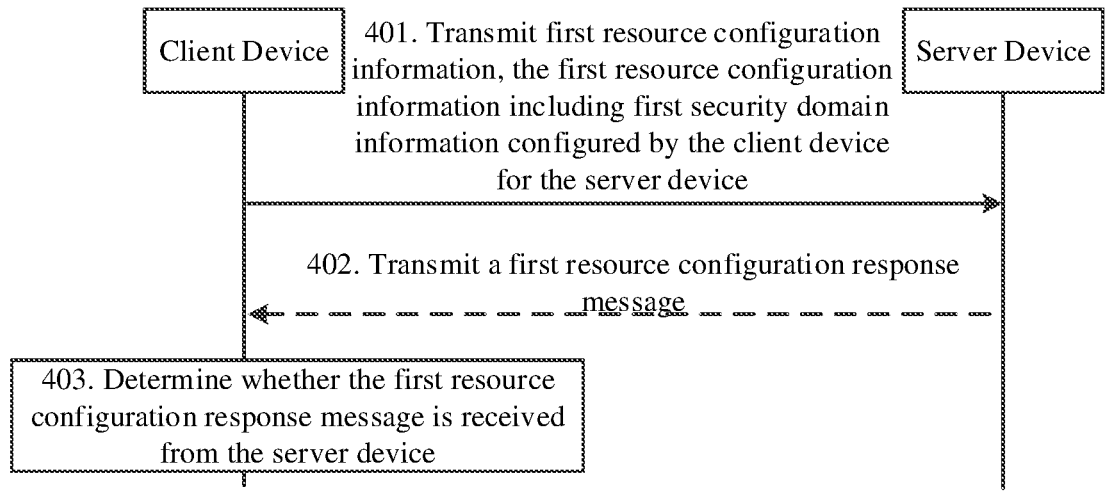
FIG. 4 is a schematic diagram showing an interaction of an information processing method according to an embodiment of the present disclosure.

As can be seen from the above embodiments, the client device pre-configures the security domain information for the server device. The security domain information of the server device is stored on the client device. A configuration process of the security domain information is described in detail below in conjunction with FIG. 4. FIG. 4 is a schematic diagram showing an interaction of an information processing method according to an embodiment of the present disclosure. As illustrated in FIG. 4, the information processing method further includes the following blocks before the operation at block 301 of the embodiment illustrated in FIG. 3.

At block 401, the client device transmits first resource configuration information to the server device. The first resource configuration information includes first security domain information configured by the client device for the server device.

The first security domain information includes a first identifier of a security domain of the server device and a first discoverability identifier. The first discoverability identifier is used to indicate that the security domain of the server device is discoverable (or that the security domain of the server device can be exposed) during multicast discovery. In an example, the first security domain information may further include the security domain name of the server device.

For example, the first resource configuration information may be expressed as:

```
UPDATE /oic/sec/sdi
{
    "uuid": "12345678-1234-1234-1234-123412341234",
    "name": "test-domain",
    "priv": "false"
},
``` where uuid represents the first identifier of the security domain, name represents the security domain name, and priv represents the security domain discoverability identifier.

At block 402, the server device transmits a first resource configuration response message to the client device based on the first resource configuration information. (Optionally)

Here, the first resource configuration response message may include the first identifier of the security domain of the server device and a first discoverability identifier, and may also include the security domain name of the server device.

At block 403, the client device determines whether the first resource configuration response message is received from the server device.

The client device receives the first resource configuration response message from the server device and determines, based on the first resource configuration response message, whether to save the first resource configuration response message.

In an embodiment of the present disclosure, when the client device receives the first resource configuration response message and security domain information in the first resource configuration response message is same as the first security domain information configured by the client device for the server device in the first resource configuration information, the client device saves the first resource configuration information, e.g., the security domain identifier uuid of the server device, or otherwise, no first resource configuration information is saved. In this embodiment, the client device saves the first resource configuration information only after determining that the first resource configuration response message is successfully received from the server device.

In an embodiment of the present disclosure, the client device receives the first resource configuration response message from the server device, and saves the first resource configuration response message regardless of whether the security domain information in the first resource configuration response message is the same as the first security domain information configured by the client device for the server device.

In an embodiment of the present disclosure, when the client device receives no first resource configuration response message from the server device, the first resource configuration information may be or may not be saved by the client device.

As can be seen from the above description, before transmitting the resource discovery request to the server device, the client device needs to transmit resource configuration information to the server device to inform the server device of the security domain information configured for the server device by the client device, and then a subsequent testing process of the server device is performed.

Based on any of the above embodiments, the client device may reconfigure the security domain information for the server device. The reconfigured security domain information may be different from the security domain information pre-configured by the client device for the server device. For example, a security domain discoverability identifier priv in the security domain information may be modified. After the client device reconfigures the security domain information for the server device, and after the client device retransmits the resource discovery request, determination results made by the client device based on whether the server device returns a resource discovery response message may be completely opposite to each other due to differences in determination logics.

A reconfiguration process of the security domain information and a subsequent information processing method will be described in detail below in conjunction with FIG. 5. It should be noted that the following embodiment can be developed based on any of the above embodiments or performed as a separate embodiment.

Figure 5:
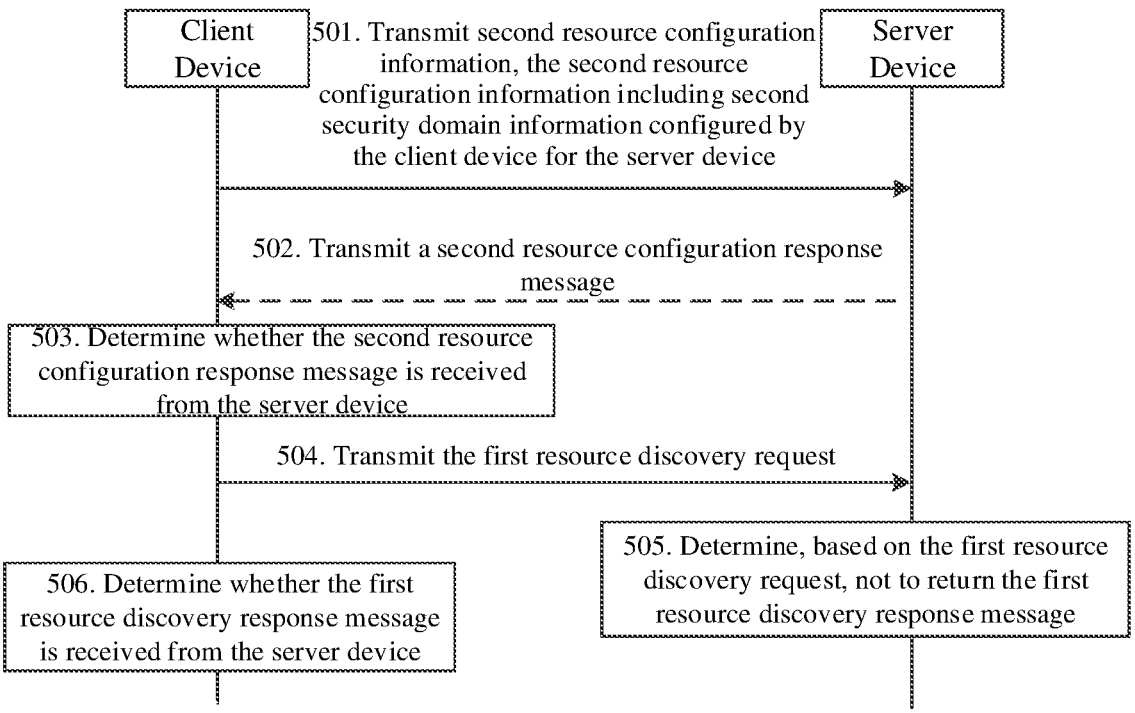
FIG. 5 is a schematic diagram showing an interaction of an information processing method according to an embodiment of the present disclosure.

FIG. 5 is a schematic diagram showing an interaction of an information processing method according to an embodiment of the present disclosure. As illustrated in FIG. 5, the information processing method according to the embodiment may include the following blocks.

At block 501, the client device transmits second resource configuration information to the server device. The second resource configuration information includes second security domain information configured by the client device for the server device.

The second security domain information is different from the first security domain information of any of the above embodiments.

In an embodiment of the present disclosure, the second security domain information includes a first identifier of the security domain of the server device and a second discoverability identifier. The second discoverability identifier is used to indicate that the security domain of the server device is undiscoverable (or the security domain of the server device cannot be exposed) during the multicast discovery. The second security domain information may further include the name of the security domain.

For example, the second resource configuration information may be expressed as:

```
UPDATE /oic/sec/sdi
{
    "uuid": "12345678-1234-1234-1234-123412341234"
    "name": "test-domain",
    "priv": "true"
}
```

In some embodiments, the second resource configuration information may be seen as resource configuration information reconfigured by the client device for the server device. In this way, compared with the example of the first resource configuration information in the embodiment of FIG. 4, the client device reconfigures a discoverability identifier of the security domain by modifying "priv=false" to "priv=true", where "priv=true" represents that the security domain is undiscoverable. Based on the new resource configuration information, the client device obtains, in response to performing the block 506, a determination result completely opposite to that obtained in the block 304 of the embodiment of FIG. 3. Reference may be made to the following description for details.

In some embodiments, the second resource configuration information may also be determined as resource configuration information pre-configured by the client device for the server device, except that the resource configuration information defines that the discoverability identifier of the security domain indicates that the security domain is undiscoverable.

At block 502, the server device transmits a second resource configuration response message to the client device based on the second resource configuration information. (Optionally)

The server device updates, based on the received second resource configuration information, local configuration information, including local security domain information. The second resource configuration response message returned by the server device may include the first identifier of the security domain of the server device and the second discoverability identifier, and may also include the security domain name of the server device.

At block 503, the client device determines whether the second resource configuration response message is received from the server device.

The block 503 is similar to the block 403 of the embodiment of FIG. 4, and thus for details thereof, reference can be made to the above embodiment.

In an embodiment of the present disclosure, the client device may perform the block 504 after determining that the second resource configuration response message is received from the server device.

In an embodiment of the present disclosure, the block 504 may be performed regardless of whether the client device receives the second resource configuration response message from the server device.

At block 504, the client device transmits the first resource discovery request to the server device. The first resource discovery request is used to request the resource information and the security domain information of the server device.

The block 504 is similar to the block 301 of the embodiment of FIG. 3, and thus for details thereof, reference can be made to the above embodiment.

For example, the first resource discovery request may be expressed as:

RETRIEVE/oic/res? sduuid=12345678-1234-1234-1234-123412341234. This request includes the first identifier "sduuid=12345678-1234-1234-1234-123412341234". Only the first identifier is used as the query condition.

At block 505, the server device determines, based on the first resource discovery request, not to return the first resource discovery response message.

In particular, the server device may determine, based on the first resource discovery request and the locally-updated resource configuration information, that the security domain information is not mapped to the res resource since priv in the updated resource configuration information is true. Therefore, the server device determines not to return the first resource discovery response message. The locally-updated resource configuration information includes the second security domain information described above.

It should be noted that since the second discoverability identifier configured by the client device for the server device indicates that the security domain is undiscoverable, the server device directly ignores the first resource discovery request after receiving the first resource discovery request and returns no first resource discovery response message.

At block 506, the client device determines whether the first resource discovery response message is received from the server device.

In particular, the client device may determine, based on whether the first resource discovery response message is received from the server device, the capability of the server device for responding to the resource discovery.

In an embodiment of the present disclosure, when the client device determines that no first resource discovery response message is received from the server device, the client device determines that the capability of the server device for responding to the resource discovery meets the test requirement.

In an embodiment of the present disclosure, the client device determines, in response to determining that the first resource discovery response message is received from the server device, that the capability of the server device for responding to the resource discovery fails to meet the test requirement.

As can be seen from the above description, in this embodiment, the capability of the server device for responding to the resource discovery is determined to meet the test requirement when no resource discovery response message is received by the client device from the server device. However, in the embodiment of FIG. 3, the capability of the server device for responding to the resource discovery is determined to meet the test requirement when it is further determined, after the client device receives the resource discovery response message from the server device, that the security domain information configured by the client device for the server device is consistent with the security domain information in the resource discovery response message returned by the server device. As can be seen, this embodiment and the embodiment of FIG. 3 have completely opposite determination logics in determining whether the capability of the server device for responding to the resource discovery satisfies the test requirement.

The information processing method according to the embodiments of the present disclosure can be applied in testing device performance. The client device transmits the second resource configuration information to the server device. The second resource configuration information includes the second security domain information reconfigured by the client device for the server device. The second security domain information is different from the first security domain information of any of the above embodiments. The server device updates a local configuration based on the received second resource configuration information. Subsequently, the client device transmits the first resource discovery request to the server device. The first resource discovery request is used to request the resource information and the security domain information of the server device. The server device determines, based on the first resource discovery request and the locally-updated configuration information, not to return the first resource discovery response message. The client device may determine, based on whether the first resource discovery response message is received from the server device, the capability of the server device for responding to the resource discovery after the security domain configuration is changed. In this embodiment, the resource discovery request is re-initiated by means of changing discoverability (or privacy settings) of the security domain of the server device. A performance test of the server device is completed based on whether the server device responds to the re-initiated resource discovery request. In this way, it can be ensured that server devices that pass the test can all correctly respond to resource discovery requests, which prevents subsequent services from being affected by performance issues of the server devices.

On the basis of any of the above embodiments, the client device may further determine whether the capability of the server device for responding to the resource discovery meets the test requirement by changing the security domain identifier in the resource discovery request. The information processing method according to the embodiments of the present disclosure will be described in detail below in conjunction with FIG. 6. It should be noted that the following embodiment can be developed based on any of the above embodiments or performed as a separate embodiment.

Figure 6:
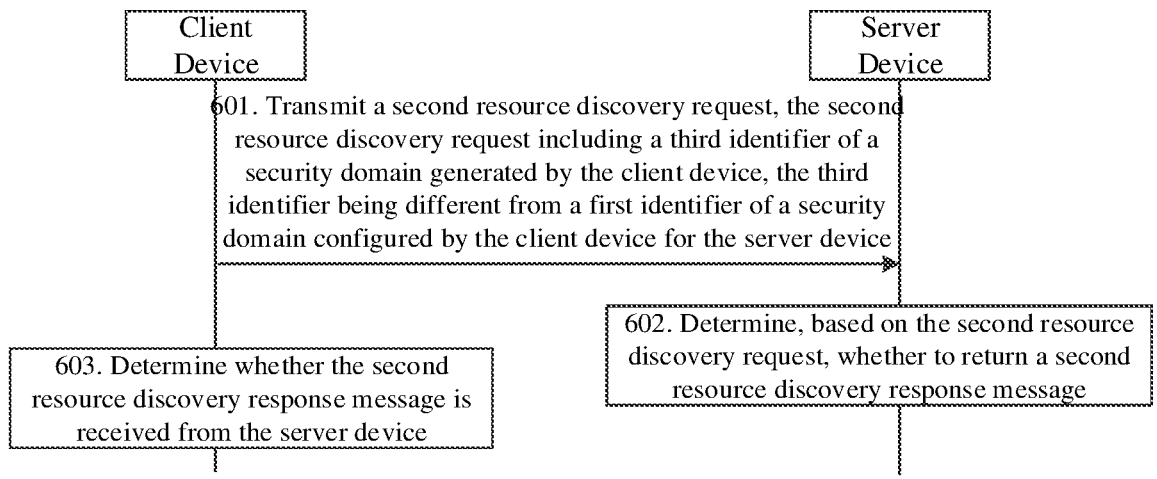
FIG. 6 is a schematic diagram showing an interaction of an information processing method according to an embodiment of the present disclosure.

FIG. 6 is a schematic diagram showing an interaction of an information processing method according to an embodiment of the present disclosure. As illustrated in FIG. 6, the information processing method of the embodiment includes the following blocks.

At block 601, the client device transmits a second resource discovery request to the server device. The second resource discovery request includes a third identifier of the security domain generated by the client device. The third identifier is different from a first identifier of the security domain configured by the client device for the server device.

In this embodiment, the third identifier is an identifier of the security domain regenerated by the client device, which is different from the first identifier of the security domain pre-configured by the client device for the server device. In an example, the client device may transmit the second resource discovery request to the server device via broadcast, multicast, or unicast.

For example, the second resource discovery request may be expressed as: RETRIEVE/oic/res?sduuid=12345678-5678-5678-5678-567856785678. As can be seen, compared with the first resource discovery request in the operation at block 301 of the embodiment of FIG. 3, the second resource discovery request includes the third identifier "sduuid=12345678-5678-5678-5678-567856785678" that is completely different from the first identifier. And no interface information may be provided. That is, only the third identifier is used as the query condition.

At block 602, the server device determines, based on the second resource discovery request, whether to return a second resource discovery response message.

When the server device determines not to return the second resource discovery response message, the server device transmits no second resource discovery response message. When the server device determines to return the second resource discovery response message, the server device transmits the second resource discovery response message to the client device.

It should be understood that, in some embodiments, the client device transmits the second resource discovery request to the server device via broadcast or multicast. Different server devices make different responses based on the second resource discovery request. In some embodiments, if for a particular server device, the client device transmits the second resource discovery request to the server device via unicast, the third identifier of the security domain carried in the second resource discovery request is not the first identifier pre-configured by the client device for the server device. When the server device has a problem with responding to the resource discovery mechanism, the server device may possibly transmit the second resource discovery response message to the client device. In this case, the client device may correctly determine, based on the block 603, whether a capability of the server device for responding meets the test requirement.

At block 603, the client device determines whether the second resource discovery response message is received from the server device.

In some embodiments, the client device may determine the capability of the server device for responding to the resource discovery based on whether the second resource discovery response message is received from the server device.

In an embodiment of the present disclosure, when the client device determines that no second resource discovery response message is received from the server device, the client device determines that the capability of the server device for responding to the resource discovery meets the test requirement. When the client device determines that the second resource discovery response message is received from the server device, the client device determines that the capability of the server device for responding to the resource discovery fails to meet the test requirement.

The information processing method according to the embodiments of the present disclosure can be applied in testing device performance. The client device transmits the second resource discovery request to the server device. The second resource discovery request includes the third identifier of the security domain generated by the client device. The third identifier is different from the first identifier of the security domain configured by the client device for the server device. In normal circumstances, after receiving the second resource discovery request, the server device determines not to transmit the second resource discovery response message in response to determining the identifier mismatch. In abnormal circumstances, the server device transmits the second resource discovery response message to the client device. The client device determines whether the capability of the server device for responding to the resource discovery meets the test requirement based on whether the second resource discovery response message is received from the server device. In this embodiment, the resource discovery request is re-initiated after changing the security domain identifier. A performance test of the server device is completed based on whether the server device responds to the re-initiated resource discovery request. In this way, it can be ensured that the server device that passes the test can correctly respond to the resource discovery request, which prevents subsequent services from being affected by performance issues of the server device.

The technical solutions provided in the present disclosure will be described below with reference to several specific examples.

Figure 7:
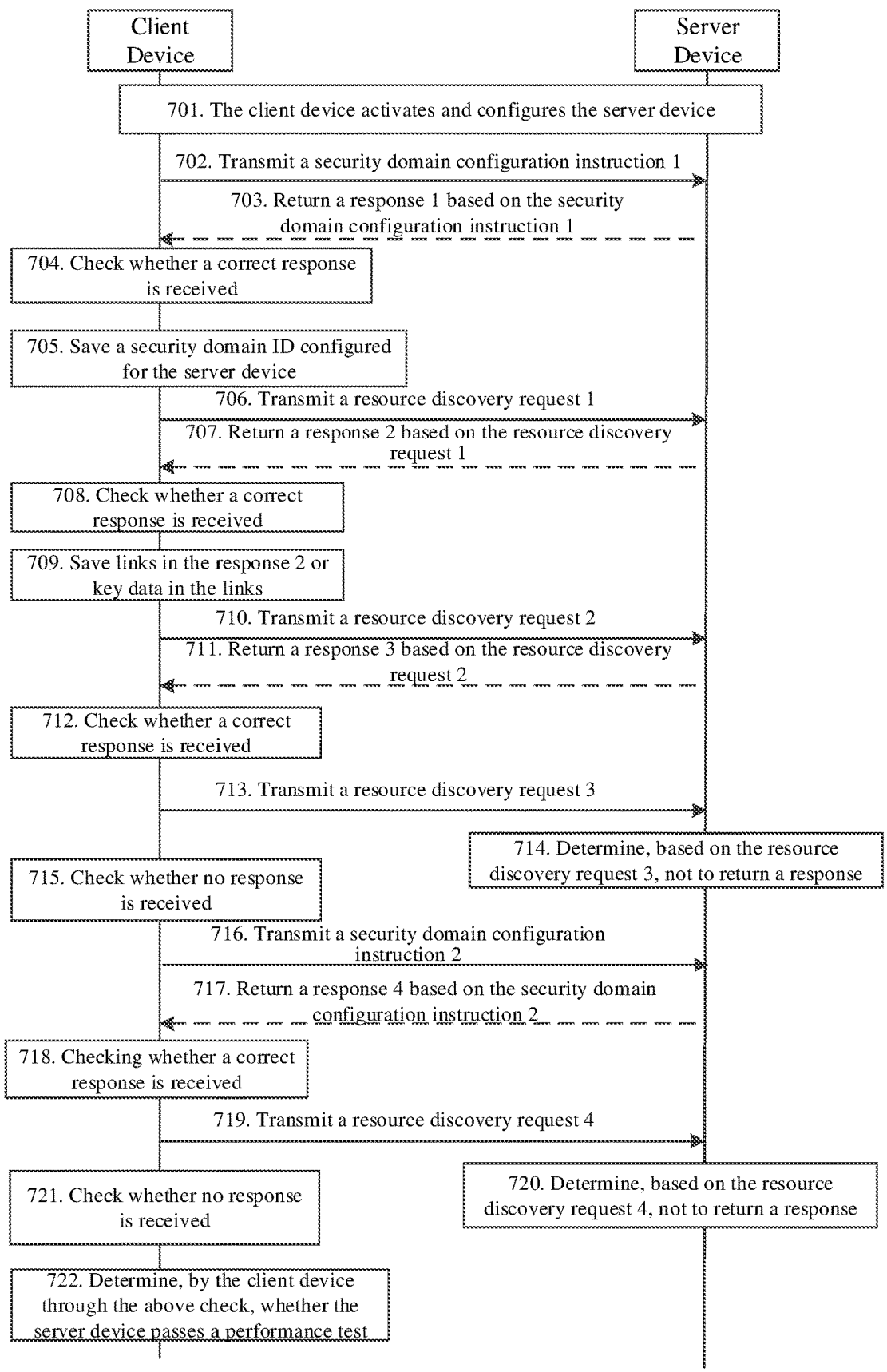
FIG. 7 is a schematic diagram showing an interaction of an information processing method according to an embodiment of the present disclosure.

FIG. 7 is a schematic diagram showing an interaction of an information processing method according to an embodiment of the present disclosure. As illustrated in FIG. 7, the information processing method according to this embodiment can include the following blocks.

At block 701, the client device activates and configures the server device.

At block 702, the client device transmits a security domain configuration instruction 1 to the server device. The security domain configuration instruction 1 includes a security domain ID, a security domain name, and a security domain discoverability identifier.

For example: UPDATE/oic/sec/sdi

```
{
    "uuid": "12345678-1234-1234-1234-123412341234",
    "name": "test-domain",
    "priv": "false"
}
```

At block 703, the server device returns a unicast response 1 to the client device based on the received security domain configuration instruction 1. The response 1 carries the security domain information in the security domain configuration instruction 1.

At block 704, the client device checks whether a correct response is received.

In this block, "a correct response is received" means that the client device receives the response 1 returned by the server device, and the response 1 carries the correct security domain information.

At block 705, the client device saves the security domain ID configured for the server device.

At block 706, the client device transmits a resource discovery request 1 to the server device. The resource discovery request 1 includes the security domain ID and a resource interface.

For example: RETRIEVE/oic/res?if=oic.if.baseline&sduuid=12345678-1234-1234-1234-123412341234

At block 707, the server device returns a unicast response 2 to the client device based on the received resource discovery request 1. For example:

```
{
    "rt": ["oic.wk.res"],
    "if": ["oic.if.ll", "oic.if.b", "oic.if.baseline"],
    "links": [
        {
            "href": "/light",
            "anchor": "ocf://11ace64c-2412-4e9f-aa8b-e6128473bb65",
            "rt": [ "oic.r.light'"],
            "if": [ "oic.if.s", "oic.if.baseline" ]
        }
    ],
    "sduuid": "12345678-1234-1234-1234-123412341234",
    "sdname": "test-domain"
}
```

At block 708, the client device checks whether the correct response is received.

In this block, when the client device receives the response 2 returned by the server device and an attribute value of sduuid in the response 2 is consistent with the uuid value saved by the client device, the client device is determined to have received the correct response.

At block 709, the client device saves links in the response 2 or key data in the links.

For example, a device identifier ID "11ace64c-2412-4e9f-aa8b-e6128473bb65" in the links is saved.

At block 710, the client device transmits a resource discovery request 2 to the server device. The resource discovery request 2 includes the security domain ID.

For example: RETRIEVE/oickes?sduuid=12345678-1234-1234-1234-123412341234

At block 711, the server device returns a unicast response 3 to the client device based on the received resource discovery request 2. For example:

```
{
    "links": [
        {
            "href": "/light",
            "anchor": "ocf://11ace64c-2412-4e9f-aa8b-e6128473bb65"
            "rt": [ "oic.r.light" ],
            "if": [ "oic.if.s", "oic.if.baseline" ]
        }
    ]
}
```

At block 712, the client device checks whether the correct response is received.

In this block, when the client device receives the response 3 returned by the server device and an attribute value (or key field) of links in the response 3 is consistent with the value (or key field) of links saved by the client device, the client device is determined to have received the correct response.

At block 713, the client device transmits a resource discovery request 3 to the server device. The resource discovery request 3 includes a different security domain ID than those described in the block 706 and the block 710.

For example: RETRIEVE/oickes?sduuid=12345678-5678-5678-5678-567856785678

At block 714, the server device determines that sduuid in the resource discovery request 3 is inconsistent with the locally-saved uuid of the server device based on the received resource discovery request 3, and returns no response.

At block 715, the client device checks whether no response is received from the server device.

At block 716, the client device transmits a security domain configuration instruction 2 to the server device. The security domain configuration instruction 2 includes a security domain ID, a security domain name, and a security domain discoverability identifier.

For example: UPDATE/oic/sec/sdi

```
{
    "uuid": "12345678-1234-1234-1234-123412341234"
    "name": "test-domain",
    "priv": "true"
}
```

At block 717, the server device returns a unicast response 4 to the client device based on the received security domain configuration instruction 2. The response 4 carries the security domain information in the security domain configuration instruction 2.

At block 718, the client device checks whether a correct response is received.

In this block, "a correct response is received" means that the client device receives the response 4 returned by the server device, and the response 4 carries the correct security domain information.

At block 719, the client device transmits a resource discovery request 4 to the server device. The resource discovery request 4 includes the security domain ID.

For example: RETRIEVE/oickes?sduuid=12345678-1234-1234-1234-123412341234

At block 720, the server device determines that a security domain requested by the resource discovery request 4 is undiscoverable based on the received resource discovery request 4, and returns no response.

At block 721, the client device checks whether no response is received from the server device.

At block 722, the client device determines whether the server device passes a performance test through the above check.

Figure 8:
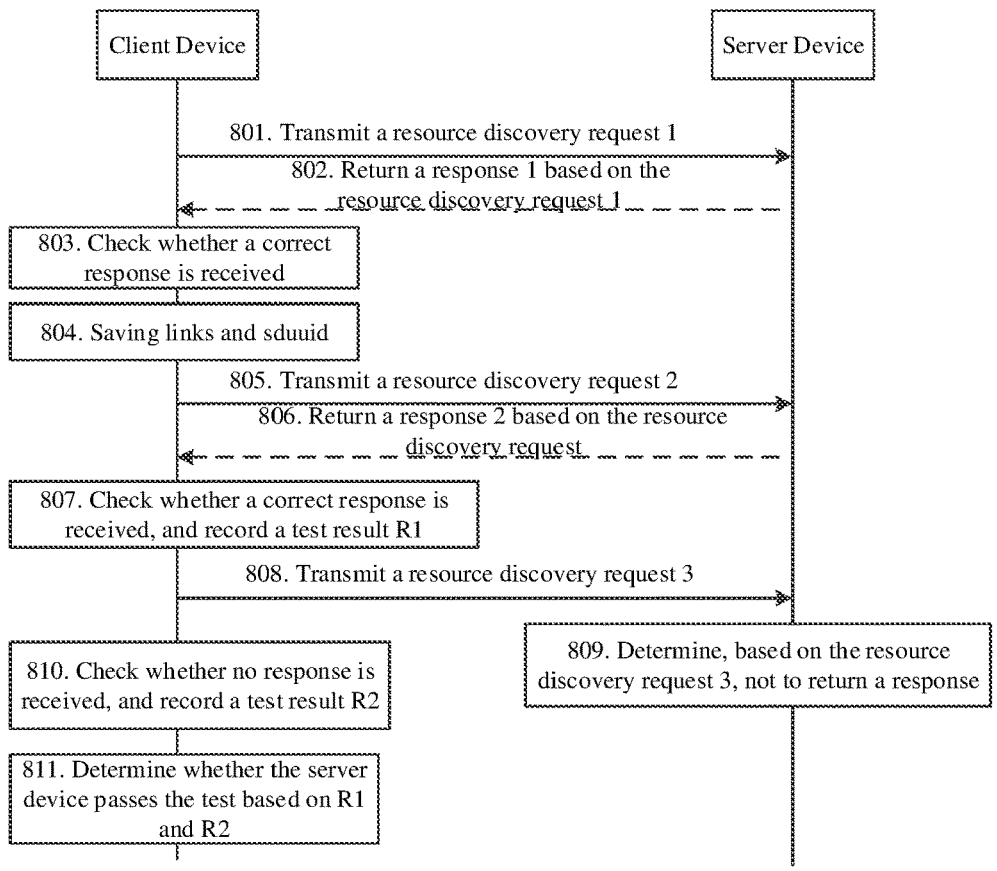
FIG. 8 is a schematic diagram showing an interaction of an information processing method according to an embodiment of the present disclosure.

FIG. 8 is a schematic diagram showing an interaction of an information processing method according to an embodiment of the present disclosure. As illustrated in FIG. 8, the information processing method according to the embodiment can include the following blocks.

At block 801, the client device transmits a resource discovery request 1 to the server device.

For example: RETRIEVE/oic/res?if=baseline

At block 802, the server device returns a unicast response 1 to the client device based on the received resource discovery request 1. For example:

```
{
  "rt": ["oic.wk.res"],
  "if": ["oic.if.ll", "oic.if.b", "oic.if.baseline"],
  "links": [
    {
      "href": "/light",
      "anchor": "ocf://11ace64c-2412-4e9f-aa8b-e6128473bb65",
      "rt": [ "oic.r.light"],
      "if": [ "oic.if.s", "oic.if.baseline" ]
    }
  ],
  "sduuid": "12345678-1234-1234-1234-123412341234"
  "sdname": "test-domain"
}
```

At block 803, the client device checks whether a correct response is received.

In this block, when the client device receives the response 1 returned by the server device and the response 1 includes links, sduuid, and sdname, the client device is determined to have received the correct response.

At block 804, the client device saves the links and sduuid, i.e., the links and sduuid in the response 1.

At block 805, the client device transmits a resource discovery request 2 to the server device.

For example: RETRIEVE/oickes?sduuid=12345678-1234-1234-1234-123412341234

At block 806, the server device returns a unicast response 2 to the client device based on the received resource discovery request 2. For example:

```
{
  "links": [
    {
      "href": "/light",
      "anchor": "ocf://11ace64c-2412-4e9f-aa8b-e6128473bb65"
      "rt": [ "oic.r.light" ],
      "if": [ "oic.if.s", "oic.if.baseline" ]
    }
  ]
}
```

At block 807, the client device checks whether the correct response is received.

When the client device receives the correct response, i.e., the client device receives the response 2 returned by the server device and an attribute value (or key field) of links in the response 2 is consistent with the value (or key field) of the links saved by the client device, a test result is recorded as R1=true.

When the client device receives no correct response, i.e., the client device receives the response 2 returned by the server device but the attribute value of the links in the response 2 is inconsistent with the value of the links saved by the client device, the test result is recorded as R1=false.

When the client device receives no response, the test result is directly recorded as R1=false.

At block 808, the client device transmits a resource discovery request 3 to the server device. The resource discovery request 3 includes a different security domain ID than that described in the block 805.

For example: RETRIEVE/oickes?sduuid=12345678-5678-5678-5678-567856785678

At block 809, the server device determines that sduuid in the resource discovery request 3 is inconsistent with the locally-saved uuid of the server device based on the received resource discovery request 3, and returns no response.

At block 810, the client device checks whether no response is received from the server device.

When the client device receives a response from the server device, the test result is recorded as R2=true. Otherwise, the test result is recorded as R2=false.

At block 811, it is determined whether the server device passes the test based on R1 and R2.

When R1=true and R2=false, the client device determines that the server device passes the test. Otherwise, the client device fails the test.

Figure 9:
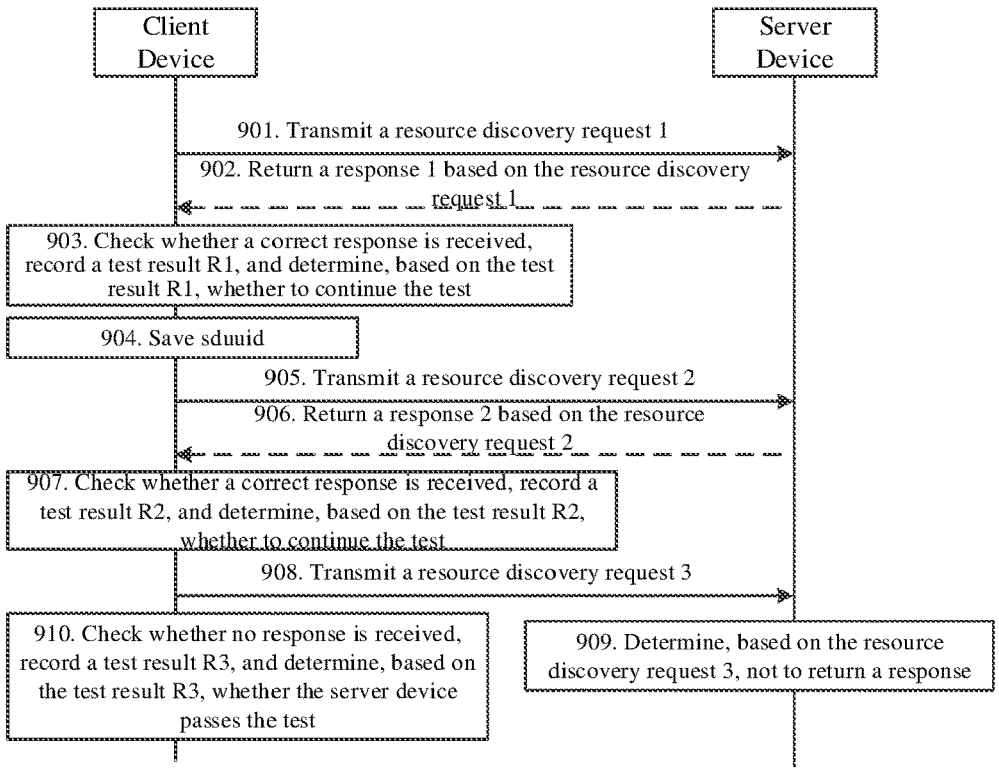
FIG. 9 is a schematic diagram showing an interaction of an information processing method according to an embodiment of the present disclosure.

FIG. 9 is a schematic diagram showing an interaction of an information processing method according to an embodiment of the present disclosure. As illustrated in FIG. 9, the information processing method according to this embodiment can include the following blocks.

At block 901, the client device transmits a resource discovery request 1 to the server device.

For example: RETRIEVE/oic/res?if=baseline.

At block 902, the server device returns a unicast response 1 to the client device based on the received resource discovery request 1. For example:

```
{
  "rt": ["oic.wk.res"],
  "if": ["oic.if.ll", "oic.if.b", "oic.if.baseline"],
  "links": [
    {
      "href": "/light",
      "anchor": "ocf://11ace64c-2412-4e9f-aa8b-e6128473bb65",
      "rt": [ "oic.r.light" ],
      "if": [ "oic.if.s", "oic.if.baseline" ]
    }
  ],
  "sduuid": "12345678-1234-1234-1234-123412341234",
  "sdname": "test-domain"
}
```

At block 903, the client device checks whether a correct response is received, records a test result R1, and determines whether to continue the test based on the test result R1.

When the client device receives the correct response, R1=true is recorded and the 904 is performed. Otherwise, the test ends.

At block 904, the client device saves sduuid.

At block 905, the client device transmits a resource discovery request 2 to the server device. The resource discovery request 2 includes a security domain ID and a resource interface.

For example: RETRIEVE/oic/res?if=oic.if.baseline& sduuid=12345678-1234-1234-1234-123412341234

At block 906, the server device returns a unicast response 2 to the client device based on the received resource discovery request 2. For example:

```
{
    "rt": ["oic.wk.res"],
    "if": ["oic.if.ll", "oic.if.b", "oic.if.baseline"],
    "links": [
        {
            "href": "/light",
            "anchor": "ocf://11ace64c-2412-4e9f-aa8b-e6128473bb65",
            "rt": [ "oic.r.light" ],
            "if": [ "oic.if.s", "oic.if.baseline" ]
        }
    ],
    "sduuid": "12345678-1234-1234-1234-123412341234",
    "sdname": "test-domain"
}
```

At block 907, the client device checks whether the correct response is received, records a test result R2, and determines whether to continue the test based on R2.

When the client device receives the correct response, i.e., an attribute value of sduuid in the response 2 is consistent with the uuid value saved by the client device, R2=true is recorded and the block 908 is performed. Otherwise, the test ends.

At block 908, the client device transmits a resource discovery request 3 to the server device. The resource discovery request 3 includes a security domain ID and a resource interface that are different from those described in the block 905.

For example: RETRIEVE/oic/res?if=oic.if.baseline& sduuid=12345678-5678-5678-5678-567856785678

At block 909, the server device determines that sduuid in the resource discovery request 3 is inconsistent with the locally-saved uuid of the server device based on the received resource discovery request 3, and returns no response.

At block 910, the client device checks whether no response is received from the server device, records a test result R3, and determines whether the server device passes the test based on R3.

When the client device receives no response from the server device, and R3=false is recorded, the client device determines that the server device passes the test. Otherwise, the client device determines that the server device fails the test.

Figure 10:
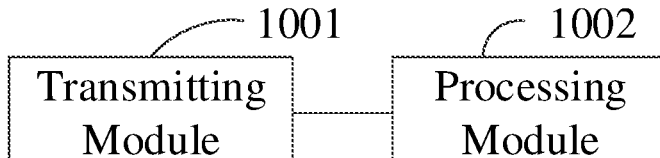
FIG. 10 is a schematic diagram showing a structure of an information processing apparatus according to an embodiment of the present disclosure.

FIG. 10 is a schematic diagram showing a structure of an information processing apparatus according to an embodiment of the present disclosure. As illustrated in FIG. 10, an information processing apparatus 1000 according to the embodiment includes a transmitting module 1001 and a processing module 1002. The transmitting module 1001 is configured to transmit a first resource discovery request to a server device. The first resource discovery request is used to request resource information and security domain information of the server device. The processing module 1002 is configured to determine whether a first resource discovery response message is received from the server device.

In an embodiment of the present disclosure, the first resource discovery request includes at least one of a first identifier of a security domain configured by the client device for the server device and a first interface. The first interface is used to instruct the server device to return the security domain information of the server device.

In an embodiment of the present disclosure, the first resource discovery response message includes at least one of a second identifier of a security domain of the server device and a second resource link of the server device.

Figure 11:
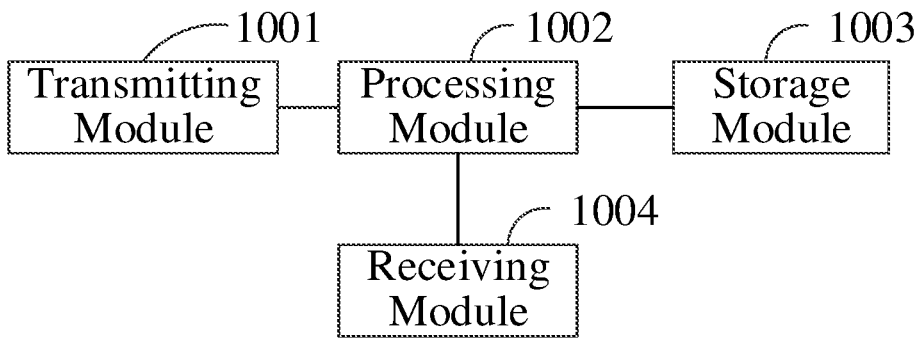
FIG. 11 is a schematic diagram showing a structure of an information processing apparatus according to an embodiment of the present disclosure.

FIG. 11 is a schematic diagram showing a structure of an information processing apparatus according to an embodiment of the present disclosure. As illustrated in FIG. 11, on the basis of the information processing apparatus illustrated in FIG. 10, the information processing apparatus 1000 of this embodiment further includes a storage module 1003 and a receiving module 1004.

The storage module 1003 is configured to save the first resource discovery response message.

In an embodiment of the present disclosure, the processing module 1002 is further configured to determine a capability of the server device for responding to resource discovery based on the first resource discovery response message when the receiving module 1004 receives the first resource discovery response message from the server device.

In an embodiment of the present disclosure, the processing module 1002 is specifically configured to: determine the capability of the server device for responding to the resource discovery based on the first identifier of the security domain configured by the client device for the server device and the second identifier of the security domain of the server device in the first resource response message.

In an embodiment of the present disclosure, the processing module 1002 is configured to determine that the capability of the server device for responding to the resource discovery meets a test requirement when the first identifier is same as the second identifier.

In an embodiment of the present disclosure, the processing module 1002 is further configured to determine that a capability of the server device for responding to resource discovery fails to meet a test requirement when the receiving module 1004 receives no first resource discovery response message from the server device.

In an embodiment of the present disclosure, the processing module 1002 is specifically configured to: determine the capability of the server device for responding to the resource discovery based on a first resource link of the client device pre-saved by the client device and a second resource link of the server device in the first resource response message.

In an embodiment of the present disclosure, the processing module 1002 is configured to determine that the capability of the server device for responding to the resource discovery meets a test requirement when the first resource link is same as the second resource link.

In an embodiment of the present disclosure, the transmitting module 1001 is further configured to transmit a second resource discovery request to the server device. The second resource discovery request includes a third identifier of a security domain generated by the client device. The third identifier is different from a first identifier of a security domain configured by the client device for the server device. The processing module 1002 is further configured to determine whether a second resource discovery response message is received from the server device.

In an embodiment of the present disclosure, the processing module 1002 is further configured to determine that a capability of the server device for responding to resource discovery meets a test requirement when the receiving module 1004 receives no second resource discovery response message from the server device.

In an embodiment of the present disclosure, the transmitting module 1001 is further configured to transmit first resource configuration information to the server device before transmitting the first resource discovery request to the server device. The first resource configuration information includes first security domain information configured by the client device for the server device. The storage module 1003 is configured to save the first resource configuration information.

In an embodiment of the present disclosure, the first security domain information includes a first identifier of a security domain of the server device and a first discoverability identifier indicating that the security domain is discoverable.

In an embodiment of the present disclosure, the transmitting module 1001 is further configured to transmit second resource configuration information to the server device before transmitting the first resource discovery request to the server device. The second resource configuration information includes second security domain information configured by the client device for the server device.

In an embodiment of the present disclosure, the second security domain information includes a first identifier of a security domain of the server device and a second discoverability identifier indicating that the security domain is undiscoverable.

In an embodiment of the present disclosure, the processing module is further configured to determine that a capability of the server device for responding to resource discovery meets a test requirement when the receiving module 1004 receives no first resource discovery response message from the server device.

The information processing apparatus according to any of the embodiments of the present disclosure is used to perform the technical solutions executed by the client device in any of the above method embodiments illustrated in FIGS. 3 to 9. Implementation principles and technical effects of the information processing apparatus according to any of the embodiments of the present disclosure are similar to those of the above method embodiments, and details thereof will be omitted here.

It should be noted that the modules of the information processing apparatus are merely divided according to logic functions, and can be entirely or partially integrated into a physical entity or physically separated from each other in an actual implementation. These modules can all be implemented in a form of software invoked by processing elements; or can all be implemented in a form of hardware; or can be partially implemented in the form of software invoked by the processing elements and partially implemented in the form of hardware. For example, the processing module may be a processing element set up alone, or may be integrated in one of the chips of the above apparatus. In addition, the processing module may also be stored in the memory of the above apparatus in a form of program codes. One of the processing elements of the above apparatus invokes and performs the above determined functions of the processing module. Other modules are implemented in a similar way to that of the processing module. Furthermore, all or some of these modules may be integrated together or may be implemented independently. The processing element described here may be an integrated circuit having signal processing capabilities. In an implementation, operations of the method described above or the above modules may be accomplished by an integrated logic circuit in hardware in the processing element or by instructions in the form of software.

For example, the above modules may be one or more integrated circuits configured to implement the above method, such as one or more Application Specific Integrated Circuits (ASIC), or one or more microprocessors (Digital Signal Processor, DSP), or one or more Field Programmable Gate Arrays (FPGA), etc. For example, when one of the above modules is implemented in a form of the processing element scheduling program codes, the processing element may be a general-purpose processor, such as a Central Processing Unit (CPU) or other processors capable of invoking program codes. For example, these modules may be integrated together and implemented as a System-On-a-Chip (SOC).

The above embodiments may be implemented in whole or in part by software, hardware, firmware, or any combination thereof. When implemented by software, the embodiments may be implemented in whole or in part in the form of a computer program product. The computer program product includes one or more computer instructions. When the computer program instructions are loaded and executed on a computer, all or part of the processes or functions according to the embodiments of the present disclosure are generated. The computer may be a general-purpose computer, a dedicated computer, a computer network, or another programmable apparatus. The computer instructions may be stored in a computer-readable storage medium, or transmitted from one computer-readable storage medium to another. For example, the computer instructions may be transmitted from one web site, computer, server, or data center to another via a wired (e.g., coaxial cable, optical fiber, Digital Subscriber Line (DSL)) or wireless (e.g., infrared, wireless, microwave, etc.) connection. The computer-readable storage medium can be any available medium that can be accessed by a computer, or can be a data storage device such as a server or a data center integrated with one or more available media. The available media may be magnetic media (e.g., floppy disks, hard disks, magnetic tapes), optical media (e.g., Digital Video Discs (DVD)), or semiconductor media (e.g., Solid State Disks (SSDs)), etc.

Figure 12:
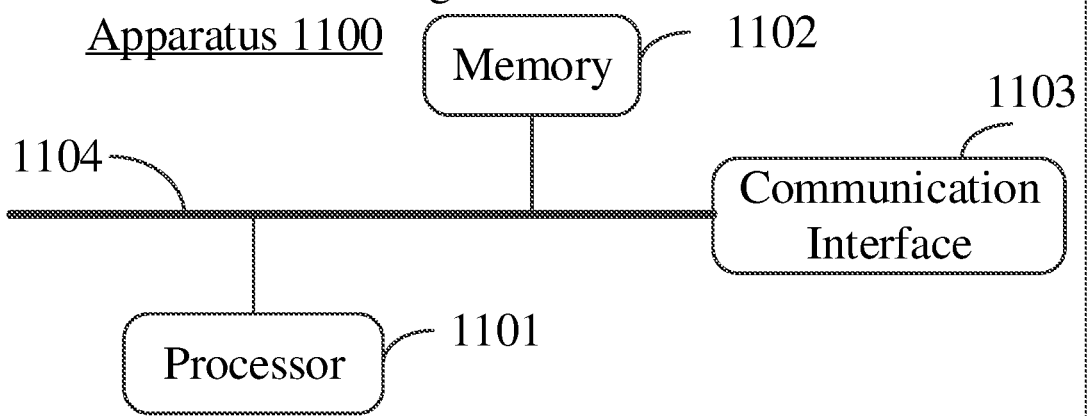
FIG. 12 is a schematic diagram showing a hardware structure of an information processing apparatus according to an embodiment of the present disclosure.

FIG. 12 is a schematic diagram showing a hardware structure of an information processing apparatus according to an embodiment of the present disclosure. As illustrated in FIG. 12, an information processing apparatus 1100 of the embodiment may include a processor 1101, a memory 1102, and a communication interface 1103. The memory 1102 is configured to store a computer program. The processor 1101, is configured to execute the computer program stored in the memory 1102 to implement the method performed by the client device in any of the method embodiments described above. The communication interface 1103 is configured to establish data communication or signal communication with other devices.

In an example, the memory 1102 may be either standalone or integrated with the processor 1101. When the memory 1102 is a device independent of the processor 1101, the information processing apparatus 1100 may further include a bus 1104 configured to connect the memory 1102 to the processor 1101.

In a possible implementation, the processing module 1002 in FIG. 10 may be integrated in the processor 1101 for an implementation and the transmitting module 1001 in FIG. 10 may be integrated in the communication interface 1103 for an implementation. The processing module 1002 in FIG. 11 may be integrated in the processor 1101 for an implementation. The transmitting module 1001 and the receiving module 1004 in FIG. 11 may be integrated in the communication interface 1103 an for implementation. The storage module 1003 in FIG. 11 may be integrated in the memory 1102 for an implementation. In a possible implementation, the processor 1101 may be configured to implement signal processing operations of the client device in any of the method embodiments described above, and the communication interface 1103 may be configured to implement signal transceiving operations of the client device in any of the method embodiments described above.

The information processing apparatus according to the embodiments can be used to perform the method performed by the client device in any of the above method embodiments. Implementation principles and technical effects of the information processing apparatus are similar to those of the above method embodiments, and thus details thereof will be omitted here.

According to an embodiment of the present disclosure, a computer-readable storage medium is further provided. The computer-readable storage medium stores computer execution instructions. The computer execution instructions, when executed by a processor, implement the technical solutions of the client device in any of the above method embodiments.

According to an embodiment of the present disclosure, a computer program is further provided. The computer program, when executed by a processor, implements the technical solutions of the client device in any of the above method embodiments.

According to an embodiment of the present disclosure, a computer program product is further provided. The computer program product includes program instructions configured to implement the technical solutions of the client device in any of the above method embodiments.

According to an embodiment of the present disclosure, a chip is further provided. The chip includes a processing module and a communication interface. The processing module can perform the technical solutions of the client device in any of the above method embodiments.

Further, the chip also includes a storage module (e.g., a memory). The storage module is configured to store instructions. The processing module is configured to execute the instructions stored in the storage module. An execution of the instructions stored in the storage module causes the processing module to perform the technical solutions of the client device in any of the above method embodiments.

In the present disclosure, "at least two" refers to two or more, and "a plurality of" refers to two or more than two. "And/or" describes an association relationship between correlated objects, including three relationships. For example, "A and/or B" can mean A only, B only, or both A and B. Here, A and B can be singular or plural. The symbol "/" generally indicates an "or" relationship between the correlated objects preceding and succeeding the symbol. In formulas, the symbol "/" indicates an "division" relationship between the correlated objects preceding and succeeding the symbol. "At least one of the following items" or similar expressions refer to any combination of these items, including a single item or any combination of a plurality of items. For example, at least one of a, b, or c can represent a, b, c, a and b, a and c, b and c, or a, b, and c, where a, b, and c each can be singular or plural.

It should be understood that the various numerical numbers involved in the embodiments of the present disclosure are only distinctions made for convenience of description, rather than limitations on the scope of the embodiments of the present disclosure.

It should be understood that in the embodiments of the present disclosure, numerical values of sequence numbers of the above processes do not mean an execution order as the execution order of individual processes should be determined by their functions and internal logics, and should not constitute any limitation to an implementation process of the embodiments of the present disclosure.

What is claimed is:

1. An information processing method, comprising:
    transmitting, by a client device, a first resource discovery request to a server device, wherein the first resource discovery request comprises security domain information of the server device;
    determining, by the client device, whether a first resource discovery response message is received from the server device;
    transmitting, by the client device, a second resource discovery request to the server device, wherein the second resource discovery request comprises a third identifier of a security domain, the third identifier being different from a first identifier of a security domain of the server device;
    determining, by the client device, whether a second resource discovery response message is received from the server device; and
    when the client device determines that no second resource discovery response message is received from the server device, determining, by the client device, that a capability of the server device for responding to resource discovery meets a test requirement.

2. The method according to claim 1, wherein the first resource discovery request comprises a first identifier of a security domain of the server device.

3. The method according to claim 1, further comprising, when the client device determines that the first resource discovery response message is received from the server device:
    determining, by the client device, a capability of the server device for responding to resource discovery based on the first resource discovery response message.

4. The method according to claim 1, further comprising, prior to transmitting, by the client device, the first resource discovery request to the server device:
    transmitting, by the client device, first resource configuration information to the server device, wherein the first resource configuration information comprises first security domain information configured by the client device for the server device.

5. The method according to claim 4, wherein the first security domain information comprises a first identifier of a security domain of the server device and a first discoverability identifier indicating that the security domain is discoverable.

6. The method according to claim 1, further comprising, prior to transmitting, by the client device, the first resource discovery request to the server device:
    transmitting, by the client device, second resource configuration information to the server device, wherein the second resource configuration information comprises second security domain information configured by the client device for the server device.

7. The method according to claim 6, wherein the second security domain information comprises a first identifier of a security domain of the server device and a second discoverability identifier indicating that the security domain is undiscoverable.

8. The method according to claim 7, further comprising, when the client device determines that no first resource discovery response message is received from the server device:
   determining, by the client device, that a capability of the server device for responding to resource discovery meets a test requirement.

9. A client device, comprising:
   a memory having a computer program stored thereon; and
   a processor,
   wherein the processor is configured to invoke and execute the computer program from the memory to:
   transmit a first resource discovery request to a server device, wherein the first resource discovery request comprises security domain information of the server device;
   determine whether a first resource discovery response message is received from the server device,
   transmit a second resource discovery request to the server device, wherein the second resource discovery request comprises a third identifier of a security domain, the third identifier being different from a first identifier of a security domain of the server device;
   determine whether a second resource discovery response message is received from the server device; and
   in response to determining that no second resource discovery response message is received from the server device, determine that a capability of the server device for responding to resource discovery meets a test requirement.

10. An information processing method, comprising:
    receiving, by a server device, a first resource discovery request transmitted by a client device, wherein the first resource discovery request comprises security domain information of the server device;
    determining, by the server device, whether to transmit a first resource discovery response message to the client device;
    receiving, by the server device, a second resource discovery request transmitted by the client device, wherein the second resource discovery request comprises a third identifier of a security domain, the third identifier being different from a first identifier of a security domain of the server device;
    the server device returning no response to the client device, wherein when the client device determines that no second resource discovery response message is received from the server device, the client device determines that a capability of the server device for responding to resource discovery meets a test requirement.

11. The method according to claim 10, wherein the first resource discovery request comprises a first identifier of a security domain of the server device.

12. The method according to claim 10, further comprising, prior to receiving, by the server device, the first resource discovery request transmitted by the client device:
    receiving, by the server device, first resource configuration information transmitted by the client device, wherein the first resource configuration information comprises first security domain information configured by the client device for the server device.

13. The method according to claim 12, wherein the first security domain information comprises a first identifier of a security domain of the server device and a first discoverability identifier indicating that the security domain is discoverable.

14. The method according to claim 13, wherein determining, by the server device, whether to transmit the first resource discovery response message to the client device comprises:
    determining, by the server device, to transmit the first resource discovery response message to the client device.

15. The method according to claim 10, further comprising, prior to receiving, by the server device, the first resource discovery request transmitted by the client device:
    receiving, by the server device, second resource configuration information transmitted by the client device, wherein the second resource configuration information comprises second security domain information configured by the client device for the server device.

16. The method according to claim 15, wherein the second security domain information comprises a first identifier of a security domain of the server device and a second discoverability identifier indicating that the security domain is undiscoverable.

17. The method according to claim 16, determining, by the server device, to transmit the first resource discovery response message to the client device comprises:
    returning, by the server device, no response.

* * * * *